United States Patent
Rector et al.

[11] Patent Number: 5,421,863
[45] Date of Patent: Jun. 6, 1995

[54] SELF-CLEANING INSULATOR FOR USE IN AN ELECTROSTATIC PRECIPITATOR

[75] Inventors: Charles A. Rector, Chapel Hill; J. Clayton Rosser, Broadway, both of N.C.

[73] Assignee: Trion, Inc., Sanford, N.C.

[21] Appl. No.: 943,543

[22] Filed: Sep. 11, 1992

[51] Int. Cl.$^6$ .............................................. B03C 3/40
[52] U.S. Cl. ............................................ 96/60; 95/78; 96/88
[58] Field of Search ..................... 55/146, 145, 143, 2; 95/78, 58, 57, 71; 96/64, 88, 86, 87, 92, 83, 60

[56] References Cited

U.S. PATENT DOCUMENTS

| | | | |
|---|---|---|---|
| 2,535,696 | 12/1950 | Richardson | 55/143 |
| 3,531,918 | 10/1970 | Vegeby | 55/120 |
| 3,581,470 | 6/1971 | Aitkenhead et al. | 55/138 |
| 3,707,828 | 1/1973 | Burney | 55/143 X |
| 3,714,762 | 2/1973 | Fillies et al. | 55/146 X |
| 3,788,041 | 1/1974 | Gaylord | 55/143 X |
| 3,985,525 | 10/1976 | Tomaides | 55/146 X |
| 4,093,432 | 6/1978 | Ahlrich | 55/138 |
| 4,117,255 | 9/1978 | Kawaike et al. | 55/146 X |
| 4,294,591 | 10/1981 | Kahl | 55/146 X |
| 4,373,937 | 2/1983 | Krause et al. | 55/118 |
| 4,743,277 | 5/1988 | Hartmann | 55/146 X |
| 4,846,857 | 7/1989 | Tachibana | 55/146 |

FOREIGN PATENT DOCUMENTS

| | | | |
|---|---|---|---|
| 328828 | 11/1920 | Germany . | |
| 505686 | 8/1930 | Germany . | |
| 1093447 | 11/1960 | Germany . | |
| 52-60476 | 5/1977 | Japan | 96/88 |
| 224043 | 1/1943 | Switzerland . | |
| 1136237 | 12/1968 | United Kingdom | 96/88 |
| 2046132 | 11/1980 | United Kingdom . | |

*Primary Examiner*—Richard L. Chiesa
*Attorney, Agent, or Firm*—Burns, Doane, Swecker & Mathis

[57] ABSTRACT

A device for use in an electrostatic precipitator including an electrically insulating disk having a hole, which may be a venturi-shaped passage, for receiving a tie rod and an arrangement for supporting the tie rod in the hole so as to allow a fluid to flow through the hole between an inside surface of the hole and the tie rod. An air stream deflector may be mounted on the tie rod to provide further protection and help direct air flow. A recirculating flow system may also be provided to direct clean air through the venturi-shaped passage.

14 Claims, 7 Drawing Sheets

SELF-CLEANING INSULATOR FOR USE IN AN ELECTROSTATIC PRECIPITATOR

FIELD OF THE INVENTION

The present invention relates to electrical precipitators of the electrostatic type. In particular, the invention relates to an insulator for use in an electrostatic precipitator.

BACKGROUND OF THE INVENTION

Electrostatic precipitators are used to remove contaminants, such as liquid droplets and solid particles, from a fluid in which they are suspended. The precipitation process typically includes at least two basic steps. First, the contaminated suspension is ionized by passing it through an electrical corona. The ions produced in the fluid then collide with the suspended contaminant and cause the droplets and particles to become electrically charged. The ionized fluid with the charged contaminant particles is then passed through an electrostatic field where the charged particles are urged out of the fluid by a Coulombic force. The practical aspects of electrostatic precipitation, also referred to as electrodeposition or electro-precipitation, were first demonstrated on a commercial scale in the United States by Cottrell in 1906 and further developed by Penny in 1936.

DESCRIPTION OF THE RELATED ART

Figure 1:
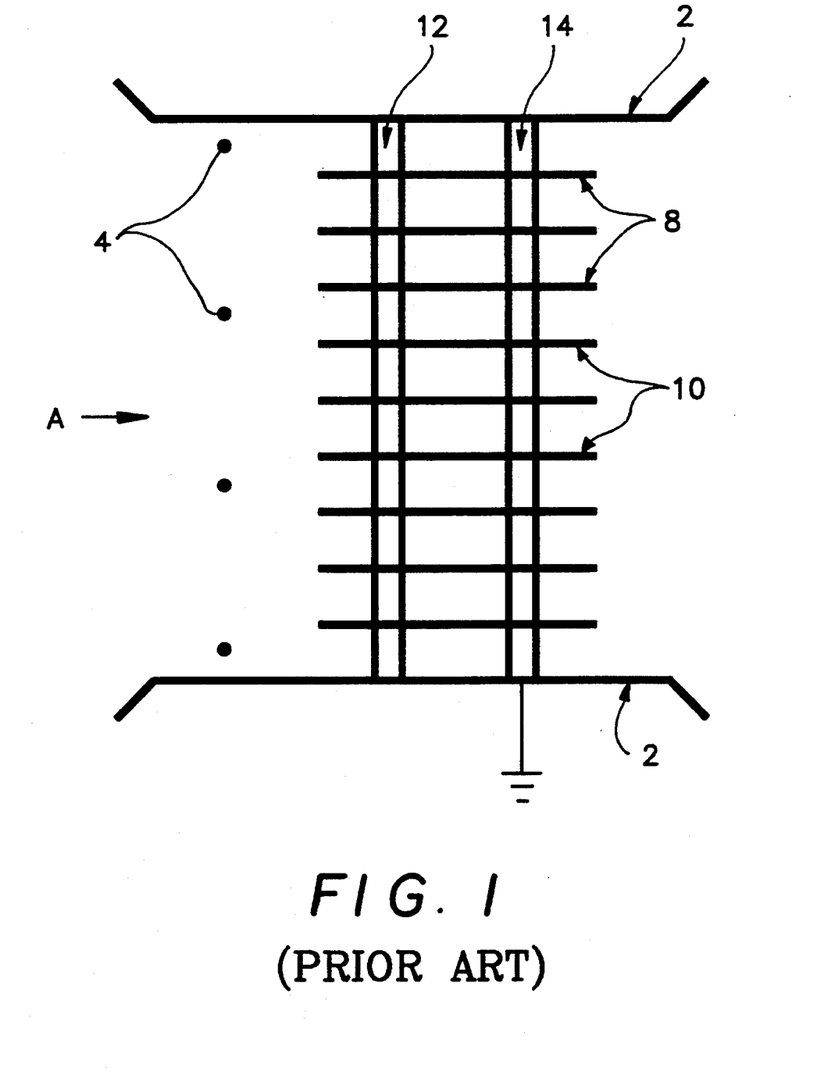
FIG. 1 is a schematic cross-sectional view of an electrostatic precipitator.

FIG. 1 schematically illustrates a cross-section of a known two-stage electrostatic precipitator. A contaminated gaseous fluid, such as air or industrial effluent, flows in the direction of arrow A into one end of a duct formed by end plates 2. In the first stage of the precipitator, the contaminated fluid flows between corona wires 4. The corona wires 4 are provided with a voltage that is sufficient to create an electrical corona around the wires. The fluid passing through the corona is ionized and contaminant particles in the fluid become charged by ion bombardment.

Further downstream in the direction of flow A, the second stage of the precipitator includes a series of high voltage plates 8 interspaced between ground plates 10. The ionized fluid with the charged contaminant particles flows into the gaps between the plates. The charged particles in the fluid are deposited on the plates 10 so that clean gas is expelled from the downstream end of the duct.

The high voltage plates 8 are electrically connected and supported between the end plates 2 on a high voltage tie rod 12. Similarly, the ground plates 10 are connected and supported between end plates 2 on a separate ground plate tie rod 14. The end plates 2 forming the walls of a fluid duct are preferably grounded in order to reduce the electrical shock hazard posed by corona wires 4 and high voltage plates 8. Furthermore, the ground plates 10, the ground plate tie rod 14, and the end plates 2 may be grounded together through the same circuit. Consequently, the high voltage plate tie rod 12 and the high voltage plates 8 must be electrically insulated from the grounded end plates 2.

Figure 2:
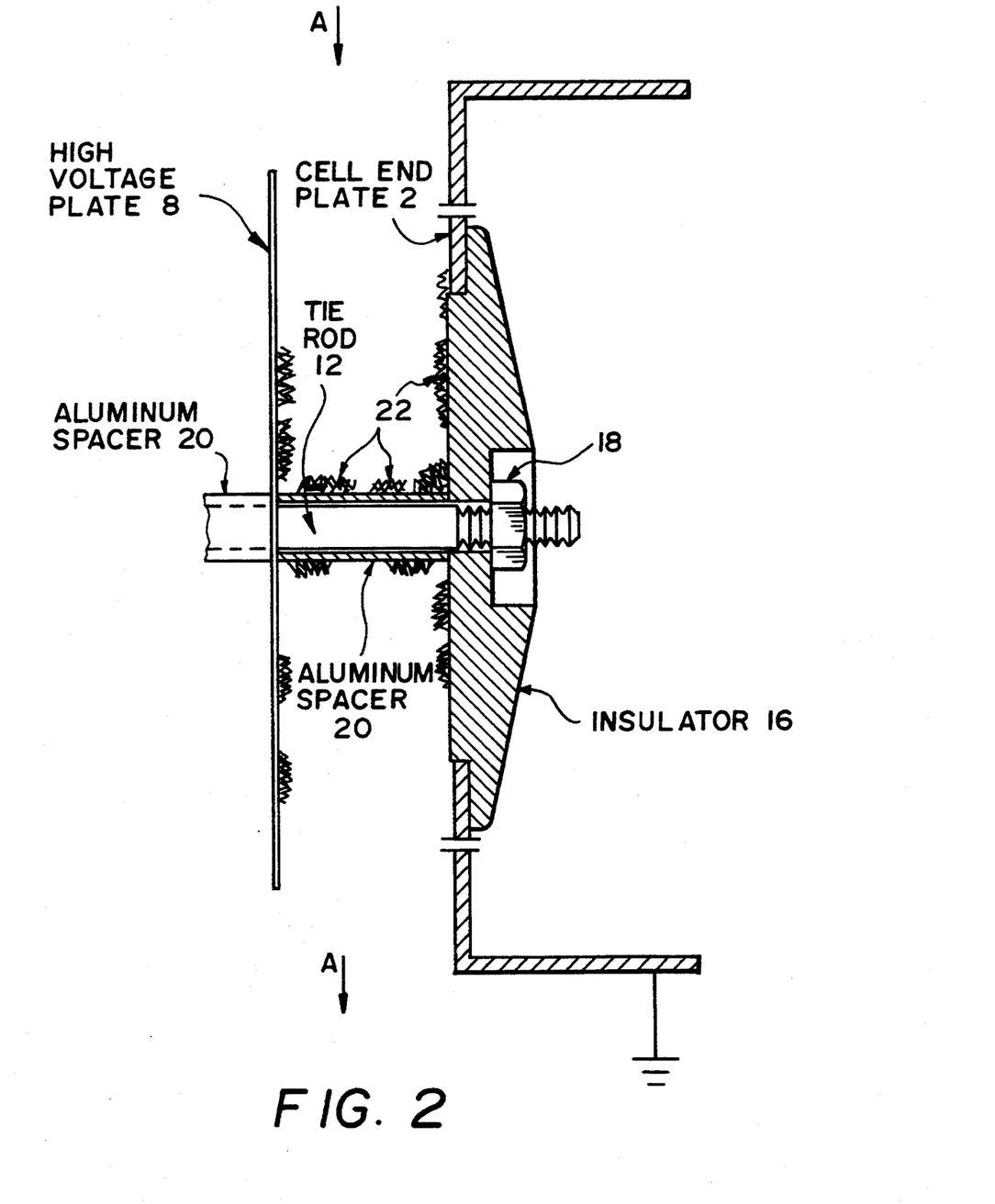
FIG. 2 is a cross-sectional view of one portion of an electrostatic precipitator showing an insulator.

FIG. 2 illustrates a conventional technique for insulating a high voltage plate 8 from a grounded end plate 2. The high voltage plate tie rod 12 extends through an insulator 16 which is held against end plate 2 on high voltage plate tie rod 12. The high voltage plate tie rod 12 may be threaded on each end and bolted to the insulator 16 by a tie rod secure nut 18. Insulator 16 is made from an electrically insulating material, such as ceramic or plastic, which inhibits current from flowing through the tie rod 12 to grounded end plate 2. A cylindrical or tubular spacer 20 may be arranged on the tie rod 12 in order to maintain the spacing between the high voltage plate 8 and the insulator 16. Similar tubular spacers 20 may be arranged between each of the high voltage plates 8.

During normal operation of the device illustrated in FIG. 2, the surfaces of high voltage plate 8, tubular spacer 20, and insulator 16 may become coated with a contaminant layer 22 which is deposited from flow A. If flow A contains a contaminant material which is electrically conductive, then contaminant layer 22 may eventually build up enough to provide an electrical path for a short circuit current from high voltage plate 8 to grounded end plate 2. This condition is sometimes referred to as "arc-over." Once the high voltage plate 8 has been short circuited, the plate and in fact the entire collector section of said precipitator will no longer function to remove contaminant material from flow A as it passes by the plate 8 and through the collector plates of said precipitator. Actually, with positive ionization, particles first accumulate on ground plates. However, some accumulation occurs on high voltage spacers by impaction, which also adds to arc-over. Consequently, the precipitator of FIG. 2 must frequently be taken out of service so that contaminant layer 22 may be cleaned from the surface of insulator 16 in order to prevent arc-over.

U.S. Pat. No. 3,531,918 to Vegeby relates to a device for protecting tubular high voltage insulators in electrostatic precipitators against both dust coatings and condensation of vapors. This patent discloses a rod (8) which is supported by a plate (2) arranged at one end of a cylindrical high voltage insulator (1). The rod is used to suspend a known emission system including an unnamed element (7).

The plate is provided with one or more large holes (3) having a constant diameter for rendering it possible to clean the interior of the insulator. A disk (14) is mounted above the plate and perforated with small holes (14a). Chamber (11) is provided with means for the supply of a compressed ventilation air or cleaned gas as protective medium, which is caused to flow downward through the small and large holes. According to Vegeby, a suitable quantity of flash gas with a relatively low pressure drop may be obtained through the small holes so that a low and uniform flowrate is thus obtained in the entire space within the cylindrical insulator and the cylindric shielding cylinder (5). Therefore, turbulence is avoided.

The Vegeby apparatus has several shortcomings which may be overcome with the present invention. The first of these drawbacks is that the Vegeby device appears to require a continuous injection of compressed fluid for proper operation. Another drawback is that a dead space of air is created between the rod and the hole in the plate through which the rod extends. This dead space may become filled with contaminant material which then reduces the overall insulative effect of the device. Furthermore, this dead space is very difficult to clean without dismantling the entire apparatus. Moreover, the large holes in the disk are arranged far enough from the outer circumference of the rod that the velocity, and cleaning effect, of any gas which moves through the holes will be greatly reduced before it arrives at the surface of the rod. In fact, Vegeby actually encourages using low velocity airflow inside the cylindrical insulator in order to prevent turbulence. Finally, a significant amount of energy will be lost by the Vegeby gas when it is flashed, or throttled, across the small and large holes. Although these energy losses can be reduced by minimizing the velocity of the gas through the holes, higher velocity gases are preferred for keeping the rod clean.

SUMMARY OF THE DISCLOSURE

The present disclosure relates to a device for use in an electrostatic precipitator including an electrically insulating disk having a hole for receiving a tie rod and means for supporting said tie rod in said hole so as to allow a fluid to flow through said hole between an inside surface of said hole and said tie rod. The hole may form a venturi-shaped passage. The venturi-shaped passage may have a diameter that increases in a direction of said fluid flow at an outlet of said venturi-shaped passage. The venturi-shaped passage may also have a diameter that decreases in said direction of said fluid flow at an inlet of said passage. The supporting means may include a spacer for centering said tie rod in said hole. The spacer may be a venturi spacer for guiding said fluid to flow into said hole in a direction which is parallel to an axis of said hole. The device may further include a deflector arranged on said tie rod for deflecting said flow of fluid as it exits said hole. The deflector may have a curved surface facing said hole. The disk may be arranged with one side parallel to and in contact with a flow of fluid through said precipitator. The fluid may include: fluid which has been processed by said precipitator.

The disclosure also relates to a device for use in an electrostatic precipitator including an electrically insulating disk having a venturi-shaped passage for receiving a tie rod, means for supporting and centering said tie rod in said passage so as to allow a fluid to flow through said passage between an inside surface of said passage and said tie rod, and a deflector arranged on said tie rod for deflecting said flow of fluid as it exits said hole. The venturi-shaped passage may have a diameter that increases in a direction of said flow at an outlet of said passage. The venturi-shaped passage may also have a diameter that decreases in said direction of flow at an inlet of said passage. The supporting and centering means may include a venturi spacer for guiding said hole. The deflector may have a curved surface facing said hole. The disk may be arranged with one side parallel to and in contact with a flow of fluid through said precipitator. The fluid may include fluid which has been processed by said precipitator.

The present disclosure also relates to a device for use in an electrostatic precipitator including an electrically insulating disk having a venturi-shaped passage for receiving a tie rod, means for supporting and centering said tie rod in said passage so as to allow a fluid to flow through said passage between an inside surface of said passage and said tie rod, and a deflector arranged on said tie rod for deflecting said flow of fluid as it exits said passage; said venturi-shaped passage having a diameter that decreases in a direction of said flow at an inlet of said passage and then increases in a direction of said flow at an outlet of said passage. The deflector may have a curved surface facing said hole. The disk may be arranged with one side parallel to and in contact with a flow of fluid through said precipitator. The fluid may include fluid which has been processed by said precipitator.

The present disclosure also relates to a method of operating an electrostatic precipitator, including an electrically insulating disk having a hole for receiving a tie rod, including the step of flowing a fluid through said hole between an inside surface of said hole and said tie rod. The fluid may include fluid which has been processed by said precipitator.

BRIEF DESCRIPTION OF THE DRAWINGS

The invention will now be further described with reference to the following figures wherein the term "Figure" has been abbreviated as "Fig." and wherein like elements have been provided with the same reference numerals.

DESCRIPTION OF THE PREFERRED EMBODIMENTS

Figure 3:
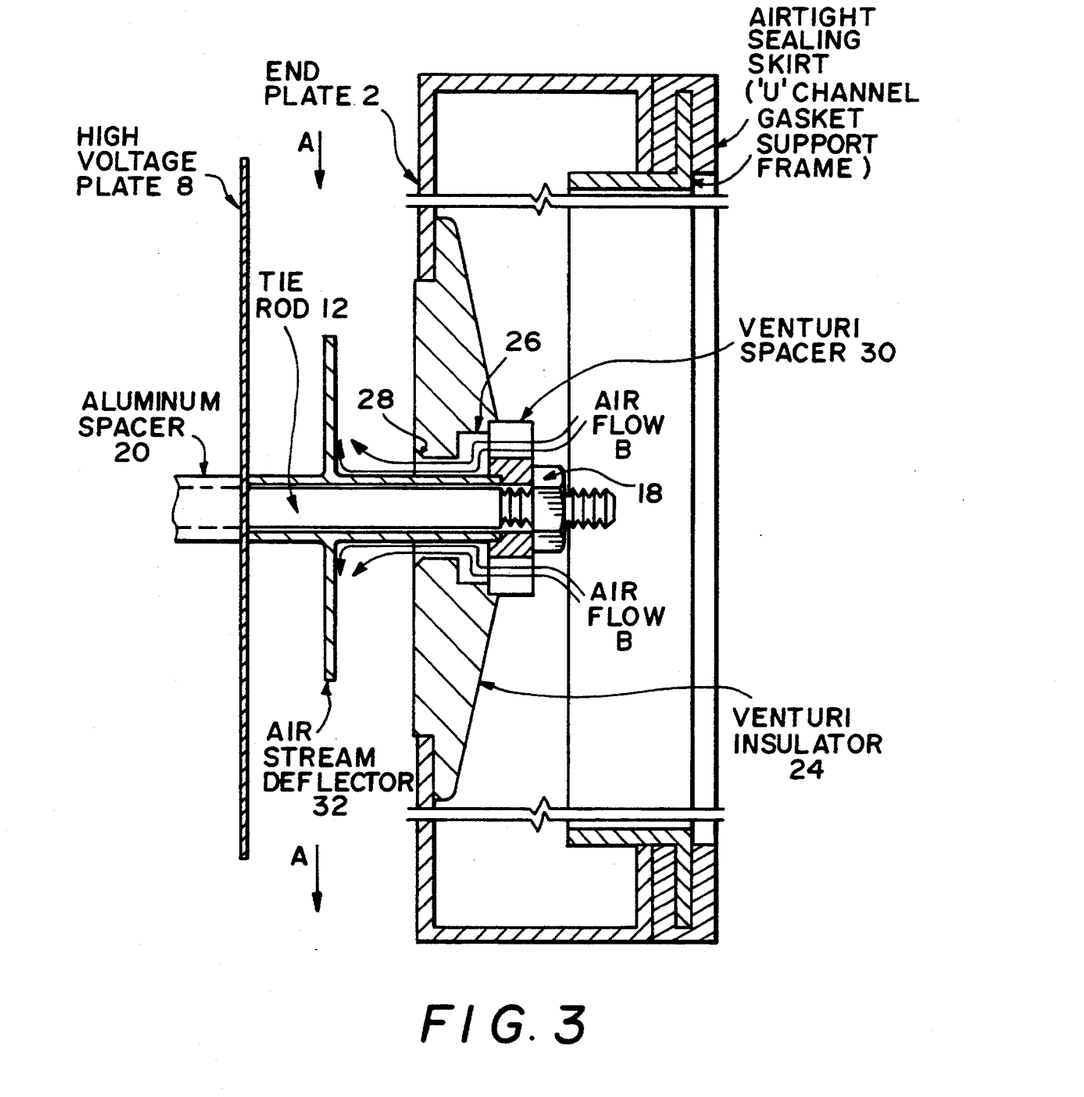
FIG. 3 is a cross-sectional view of one portion of an electrostatic precipitator showing one embodiment of a venturi insulator.

FIG. 3 illustrates one embodiment of a venturi insulator 24 arranged on a high voltage plate tie rod 12. Venturi insulator 24 may also be referred to as venturi-tube insulator 24 or venturi insulator disk 24. Although venturi insulator 24 is illustrated in the figures as being a round disk, it may also be formed in other shapes such as square, octagonal, or oval. Venturi insulator 24 may be formed from any electrically insulating material such as a thermoset glass filled polyester resin, ceramic, porcelain, or any other high voltage insulating material with good arc track resistance.

The venturi insulator 24 includes a hole or passage 26 which is preferably near the center of venturi insulator 24 for receiving or supporting the high voltage tie rod 12. The hole 26 is large enough to provide a space between the high voltage tie rod 12 and the inside wall of hole 26 for allowing a fluid, such as air, to move through the space in the direction of flow B. This space allows flow B to exit hole 26 very near the surface of high voltage tie rod 12 so that the energy in flow B is not significantly dissipated before it contacts tie rod 12 after exiting hole 26. Furthermore, there is no dead space between high voltage tie rod 12 and insulator 24 that could otherwise fill with contaminant. The velocity of flow B may be gradually increased as it enters hole 26 and increased again near the middle of hole 26 where the diameter becomes further reduced.

The hole 26 may include a chamfer 28 at one or both ends for increasing the strength of the venturi insulator 24 near the end of the hole. The chamfer 28 also helps to redirect flow B as it exits the hole 26 and serves to gradually decelerate flow B as it exits hole 26 in order to minimize the energy lost to turbulence as flow B exits hole 26. A high energy and high velocity flow may thus be delivered to the surface of tie rod 12. A similar chamfer at the inlet to hole 26 may help to minimize energy loss during acceleration of flow B at the other end of hole 26. Hole 26 may therefore form a venturi or venturi-shaped passage.

The venturi insulator 24 may be held on the high voltage tie rod 12 against an opening in end plate 2, or any other wall of the precipitator, by any conventional means such as by a tie rod secure nut 18. However, other fastening means such as cotter pins or adhesive bonding materials may be used to secure the venturi insulator 24 to the high voltage tie rod 12. The tie rod secure nut 18 and the end plate 2 may be received in recessed portions of the venturi insulator 24 to help keep the tie rod 12 centered inside the hole 26. The venturi insulator 24 may also be fastened directly to the end plate 2.

The high voltage tie rod 12 may also be fitted with a venturi spacer 30 between the venturi insulator 24 and the tie rod secure nut 18. The venturi spacer 30 bridges the upstream opening of hole 26 and helps support and center the high voltage tie rod 12 inside the hole 26. The venturi spacer 30 also helps direct or guide the flow B through the hole in a direction which is parallel to the axis of hole 26. The venturi spacer 30 is preferably made from an insulating material such as a thermoset glass filled polyester resin or any other material which may be used to form the venturi insulator disk 24.

A deflector 32 may be arranged on the high voltage plate tie rod 12 between the venturi insulator disk 24 and the tie rod secure nut 18. FIG. 3 illustrates the deflector 32 including a tubular portion which may be slid over the high voltage tie rod 122 Deflector 32 may be used to deflect flow B as it exits hole 26. Deflector 32 may also increase the pressure, or create a positive fluid pressure, in the area around the inside face of the hole 26 by deflecting a portion of flow B perpendicular to the axis of the hole 26 when it exits the hole 26.

The deflector 32 may be made from a high voltage insulating material with good arc track resistance. Thus, the tie rod 12 is shielded by the air stream deflector 32. Accordingly, the possibility of arc over between the tie rod 12 and the venturi insulator 24 is substantially reduced. In addition, the disk portion of the deflector 32 significantly increases the potential high voltage tracking distance.

The deflection and/or increased pressure created by the deflector 32 causes the contaminant passing through the cell in the direction of flow A to be deflected away from the venturi insulator 24 and hole 26 and allows the face of venturi insulator 24 to remain clean. Consequently, the arc track distance between high voltage plate 8 and grounded end plate 2 may be maintained. The operating time between cleanings of the electrostatic precipitator can thus be significantly increased, especially when the precipitator is used with contaminants which are electrically conductive. The deflector 32 may also be referred to as an air stream deflector 32.

Figure 4:
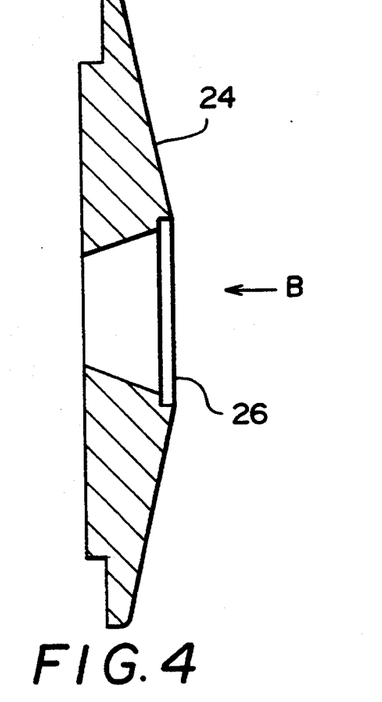
FIGS. 4 and 5 are cross-sectional views of venturi insulators for use in the electrostatic precipitator of FIG. 3.
Figure 5:
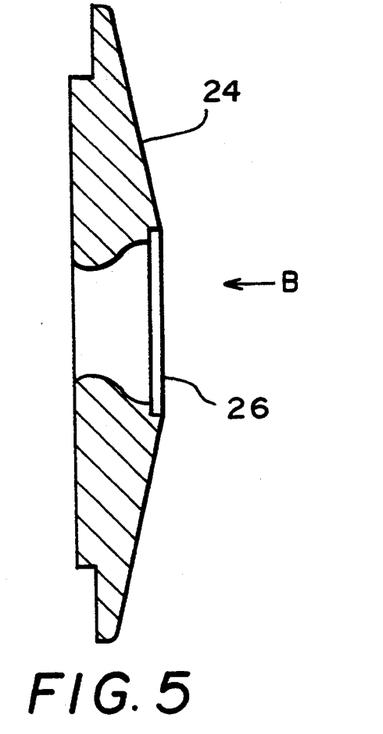

FIGS. 4 and 5 illustrate cross-sections of alternative embodiments of the venturi insulator 24. In FIG. 4, the hole 26 has a decreasing diameter in the direction of flow B. The hole 26 in FIG. 4 has a linearly decreasing diameter in the direction of flow B. However, the diameter of hole 26 could be also constant or decrease in a non-linear fashion.

FIG. 5 illustrates an embodiment of venturi insulator 24 wherein the diameter of hole 26 decreases in a curved or non-linear fashion. The generally decreasing diameter of hole 26 in FIG. 5 gradually increases the velocity of flow B through venturi insulator 24 so that the flow B exiting the hole 26 achieves the greatest possible velocity with the least possible frictional losses inside the hole 26. The diameter of hole 26 near the outlet for flow B may slightly increase to gradually decelerate flow B near the outlet in order to minimize the turbulence and associated energy losses near the outlet. Hole 26 may therefore be a venturi or venturi-shaped passage.

Figures 6, 7:
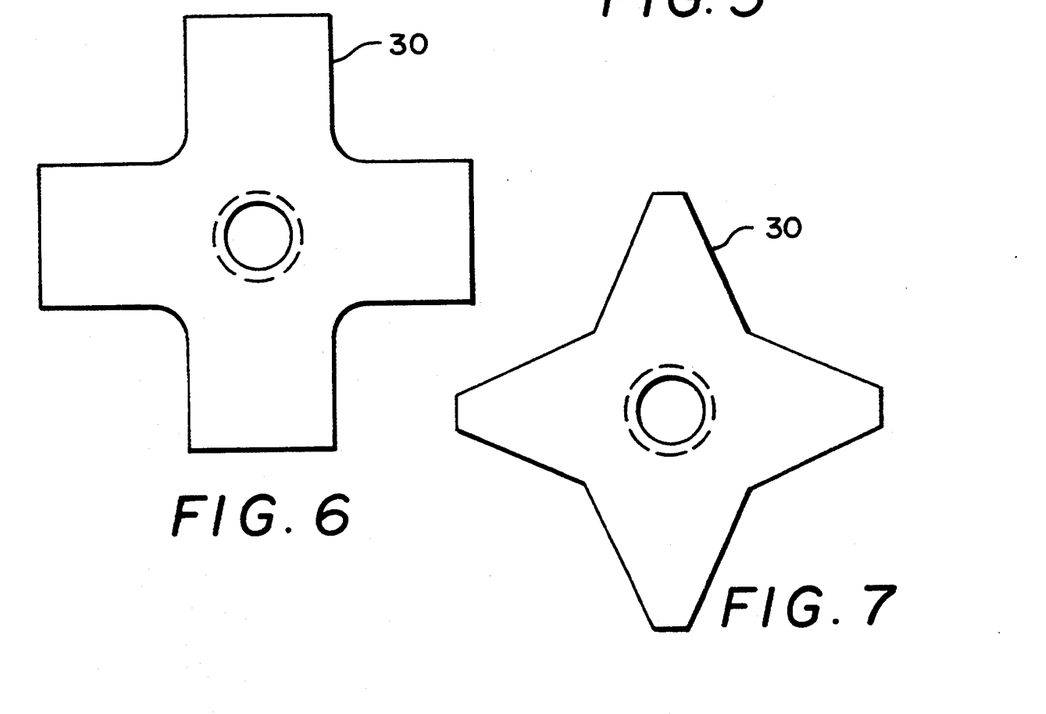
FIG. 6 is a plan view of a venturi spacer for use with the venturi insulators shown in FIGS. 3, 4, and 5.
FIG. 7 is a plan view of another venturi spacer for use with the venturi insulators shown in of FIG. 3, 4, and 5.

FIG. 6 illustrates a plan view of one possible embodiment of the venturi spacer 30. Venturi spacer 30 helps center high voltage tie rod 12 in hole 26. Venturi spacer 30 may also guide or direct flow B in a direction which is parallel to the axis of hole 26. The venturi spacer 30 of FIG. 6 is cross-shaped with rounded corners near the intersection of the arms of the cross for increasing the strength of the spacer. An alternative embodiment of the venturi spacer 30 is illustrated in FIG. 7. FIG. 7 illustrates a star-shaped venturi spacer 30. The star-shape illustrated in FIG. 7 may allow more air to pass into the hole 26 between the arms of the star.

Although each of the shapes in FIG. 7 has been shown with four arms, a greater or lesser number of arms may also be used. For example, the venturi spacer 30 may include just two arms which extend in opposite directions for allowing the greatest amount of air to flow into the hole 26 while still supporting and centering the high voltage tie rod 12. The dashed lines in FIGS. 6 and 7 indicate recessed portions on one side of the venturi spacer 30 for receiving one end of deflector 32 as illustrated in FIG. 3.

Figure 8:
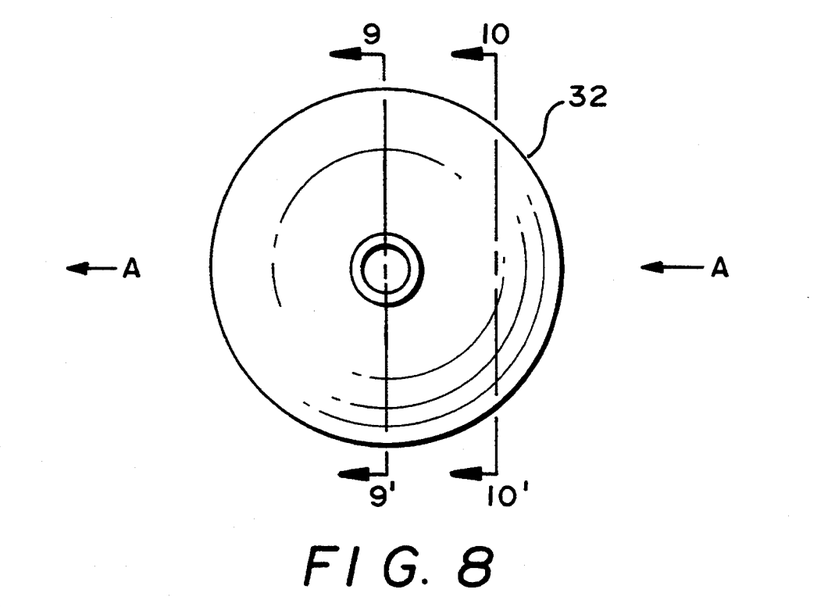
FIG. 8 is a plan view of an alternative embodiment of the deflector shown in FIG. 3.
Figure 9:
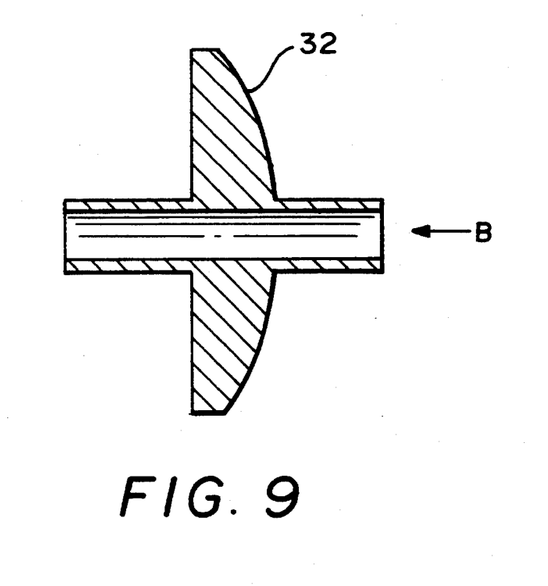
FIG. 9 is a cross-sectional view taken along section line 9–9' in FIG. 8.
Figure 10:
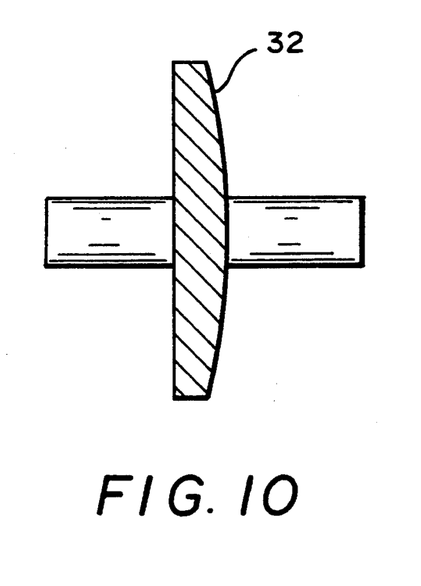
FIG. 10 is a cross-sectional view taken along section line 10–10' in FIG. 8.

FIG. 8 illustrates a plan view of an alternative embodiment of a the deflector 32 in relation to flow A. As illustrated in the cross-sections of FIGS. 9 and 10, one side of the surface of deflector 32 may be curved while the other side is flat. The curved side of air stream deflector 32 is preferably arranged to face the exit of venturi hole 26 against flow B. Due to the restricted diameter between the curved surface of the deflector 32 and the venturi insulator 24, the velocity of flow A should increase between the deflector 32 and the venturi insulator 24 as it flows over the curved surface of the deflector 32 near the exit of hole 26. This increased velocity of air stream A near the exit of the hole 26 serves to increase the cleaning effect of the flow near the exit of hole 26. Other alternatives might include a square or rectangularly shaped disk portion of the deflector 32.

Figure 11:
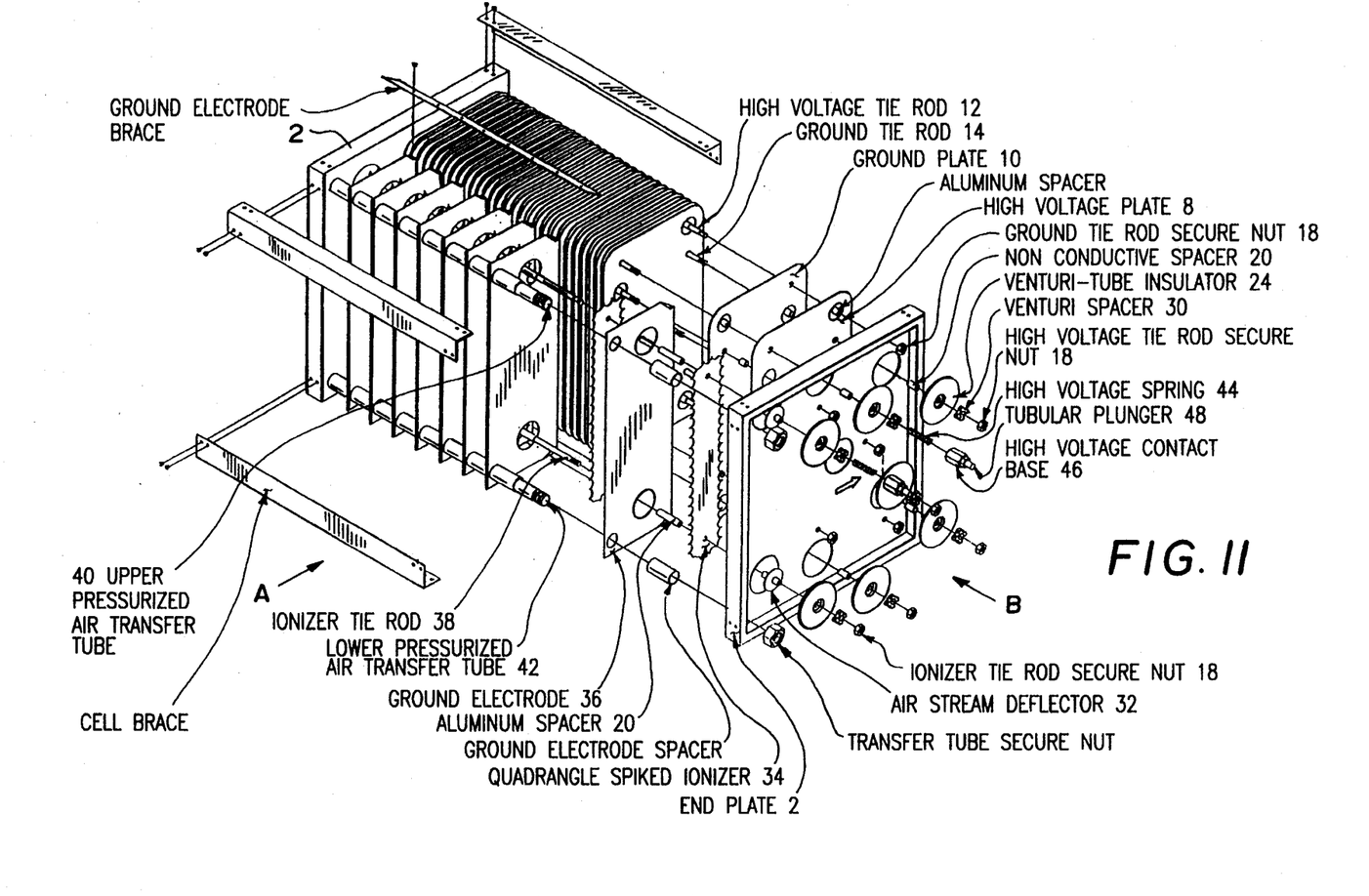
FIG. 11 is an exploded isometric view of an ionizer/collector cell of an electrostatic precipitator, including several venturi insulators.

FIG. 11 is an exploded isometric view of an ionizer/collector cell compartment of an electrostatic precipitator including several venturi insulator disks 24. In the first stage of the cell illustrated in FIG. 1, corona wires 4 have been replaced with quadrangle spiked ionizer plates 34 and ground electrodes 36. Several ionizer tie rods 38 secure quadrangle spiked ionizer plates 34 between end plates 2. An upper pressurized air transfer tube 40 and a lower pressurized air transfer tube 42 are arranged through the ground electrodes 36 for transferring air to the center of two parallel cells as will be described in more detail below with reference to FIG. 12. The upper and lower pressurized air transfer tubes 40, 42 may also serve to support ground electrodes 36. It has also been found useful to arrange deflectors 32 between the quadrangle spiked ionizer plates 34 and end plate 2 in the first stage.

The second stage of the ionizer/collector cell illustrated in FIG. 11 includes several ground plates 10 interspaced between high voltage plates 8. Several high voltage tie rods 12 secure the high voltage plates 8 between end plates 2 while several ground plate tie rods 14 secure the ground plates 10 between end plates 2. The ground plates 10 may be electrically connected to the grounded end plates 2 through ground plate tie rods 14. Consequently, the venturi insulators 24 are not required for ground plate tie rods 10.

Tubular spacers 20 may be arranged on each of the tie rods for maintaining an appropriate distance between the plates. The tubular spacers 20 separating high voltage plates 8 and the tubular spacers 20 separating ground plates 10 may be formed from an electrically conductive material, such as aluminum which is noncorrosive, light weight, and inexpensive. The tubular spacers 20 which are arranged between the end plates 2 and the high voltage plates 8 are preferably formed from a nonconductive material, such as a thermoset glass filled polyester resin, or any other material which may be used for venturi insulator 24.

Each tie rod may be secured to the end plates 2 by a tie rod secure nut 18. Tubular plungers 48 are provided to make high voltage contact from power supply high voltage contacts between ionizer/collector cells. Springs 44 are provided to load the tubular plungers 48 so as to ensure high voltage contact between the cells and/or power supply. Alternatively, springs 44 may have one end resting directly against tie rod secure nut 18.

Figure 12:
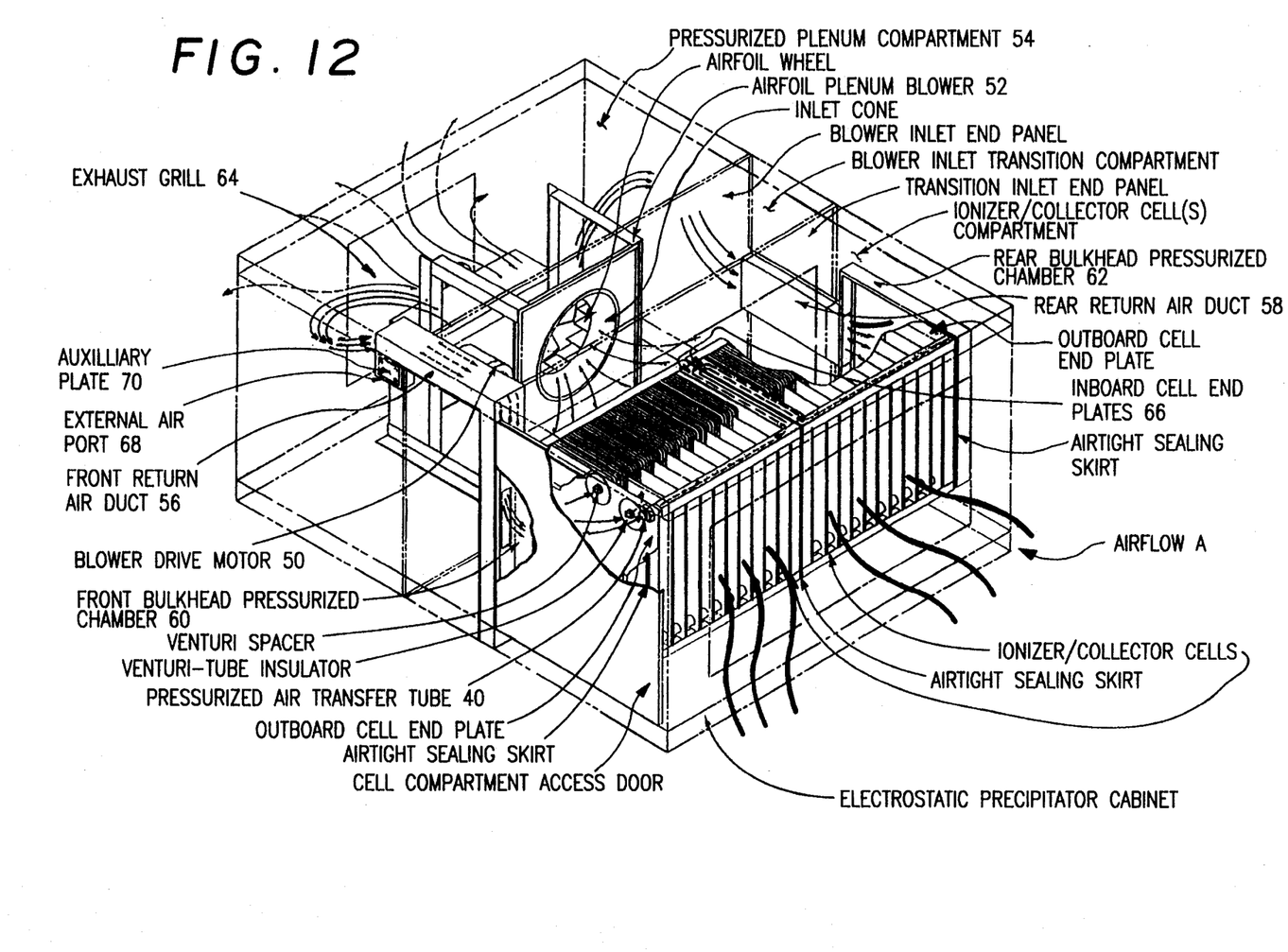
FIG. 12 is an isometric view of an electrostatic precipitator utilizing several venturi insulators with air recirculation.

FIG. 12 is an isometric view of an electrostatic precipitator utilizing several venturi insulators with air recirculation. The integrated unit in Figure 12 utilizes two ionizer/collector cells arranged in parallel. However, the integrated unit can be constructed to utilize a single cell, as well as two or more cells in parallel. Where multiple cells are used, any number of ionizer/collector cells may be stacked so that the height is controlled by the number and diameter of air transfer tubes incorporated within the cell assemblies.

The integrated unit of FIG. 12 is provided with a blower drive motor 50 and an airfoil blower 52 which pulls air into the unit through the ionizer/collector cells. The processed fluid is discharged from airfoil blower 52 into a pressurized plenum compartment 54. Part of the processed air from the pressurized plenum compartment 54 may be ducted, or channeled, through a front return air duct 56 and rear return air duct 58 to front and rear bulkhead pressurized chambers 60, 62, respectively. The remainder of the clean processed air may be discharged out of the rear of the unit through exhaust grill 64. Once inside the bulkhead pressurized chambers 60, 62, part of the cleaned air (i.e., flow B) moves through holes 26 in venturi insulators 24 while the remainder of the air in the pressurized chambers goes into upper and lower pressurized air transfer tubes 40, 42. As illustrated in FIG. 12, upper and lower pressurized air transfer tubes 40, 42 connect the bulkhead pressurized chambers with similar chambers formed near the center by the inboard cell end plates 66. Consequently, flow B may be supplied to venturi insulator disks 24 at each end of both ionizer/collector cells.

A difference in pressure between the ionizer/collector cell chamber and the pressurized planum compartment 54 is created by the airfoil blower 52. That difference is sufficient to create an airflow through the venturi insulator disks 24.

It is has been found by the present inventors that preferably air which is processed by the precipitator, or clean air from another source, should be delivered to venturi insulators 24 in order to operate the precipitator for extended periods of time. The passage of any contaminant material into hole 26 in venturi insulator 24 may ultimately contribute to arc-over and shut down of the collecting system. The integrated unit of FIG. 12 is therefore constructed so that flow B through the venturi insulator disks 24 may be provided from three different sources depending on the particular contaminant being collected.

First, clean air may be recirculated from pressurized plenum compartment 54 to the venturi insulators 24 via front and rear air return ducts 56, 58. In that mode, an auxiliary plate 70 may cover an external air port 68 in the front return duct 56 in order to prevent outside air from entering during normal recirculation operation. Second, the front and rear air return ducts 56, 58 may be closed to recirculated air and outside air may be drawn into the front and rear air return ducts 56, 58 through the external air port 68. For example, if the air being process through the precipitator contains conductive particles, such as carbon, it may be preferable to use outside air introduced through the external air port 68 instead of the recirculated air, because residual conductive particles that were not removed during processing may cause premature arc overs. The outside air may be pressurized or it may be drawn into the precipitator cell as a result of a low pressure created in the cell by the blower 52.

Alternatively, the auxiliary plate 70 may be hinged, or louvered, to allow external air port 68 to open only when outside air is needed or to allow a mixture of recirculated and clean air to be created in the return air ducts.

The principles, preferred embodiments, and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the invention as defined by the following claims.

What is claimed is:

1. A device for use in an electrostatic precipitator having an end wall defining a chamber in which a first fluid to be cleaned flows, comprising:

an electrically insulating disk, said disk including means for mounting the disk in an opening in the end wall of the electrostatic precipitator so that a first side of the disk is within the flow of the first fluid to be cleaned, said disk having a second side opposite the first side, said disk also having a hole for receiving a support rod;

means for supporting said support rod in said hole so as to allow a second fluid to flow through said hole between an inside surface of said hole and said support rod;

said hole begins at the second side of the disk and ends at the first side of the disk, and includes means for accelerating the flow of said second fluid through the disk into the chamber of the electrostatic precipitator, said hole includes a region wherein the diameter of the hole is reduced from a first diameter at the second side of the disk to a second diameter, that is narrower than the first diameter, at the first side of the disk; and a nonconductive deflector arranged on said support rod for deflecting said flow of said second fluid after it exits said hole;

wherein said deflector includes:

a nonconductive sleeve portion that fits securely on and extends along said support rod at a portion of said support rod that passes through said end wall; and an annular plate surrounding said sleeve and extending substantially perpendicular to said sleeve at a location outside of said hole so that said second fluid that is accelerated through said hole contacts said annular plate and creates turbulence in the vicinity of said support rod and said hole.

2. A device as claimed in claim 1, wherein said supporting means includes a spacer for centering said support rod in said hole.

3. A device as claimed in claim 2, wherein said spacer is a venturi spacer for guiding said second fluid to flow into said hole in a direction which is parallel to an axis of said hole.

4. A device as claimed in claim 2, wherein said spacer includes a center section for engaging said support rod and a plurality of legs extending outwardly from said center section for engaging with the electrically insulating disk.

5. A device as claimed in claim 1, wherein the first side of said disk is arranged parallel to and in contact with the flow of the first fluid through said precipitator chamber.

6. A device as claimed in claim 1, wherein said second fluid includes the first fluid which has been processed by said precipitator.

7. The device of claim 1, further comprising:

a duct for conducting the second fluid to said hole; and selection means on said duct, selectable between a first mode in which the first fluid having been processed through said electrostatic precipitator is directed through the duct to said hole and a second mode in which fluid from an outside source is directed through said duct to said hole.

8. The device of claim 7, wherein said selection means includes a plate for covering an external air port in the duct.

9. The device of claim 7, wherein said selection means is selectable to a third mode which allows a mixture of the first fluid and fluid from an outside source.

10. A device for use in an electrostatic precipitator having an end wall defining a chamber in which a first fluid to be cleaned flows, comprising:

an electrically insulating disk, said disk including means for mounting the disk in an opening in the end wall of the electrostatic precipitator so that a first side of the disk is within the flow of the first fluid to be cleaned, said disk also having a hole for receiving a support rod;

means for supporting said support rod in said hole so as to allow a second fluid to flow through said hole between an inside surface of said hole and said support rod;

said hole having a shape for accelerating the flow of said second fluid through the disk into the chamber of the electrostatic precipitator; and a nonconductive deflector arranged on said support rod, said deflector including a sleeve that fits securely on and extends along said support rod in the region where said support rod passes through said hole, said deflector including an annular plate substantially perpendicular to an axis of said support rod for deflecting said flow of said second fluid after it exits said hole so as to create turbulence between the insulating disk and the plate.

11. The device of claim 10, further comprising:

a duct for conducting the second fluid to said hole; and selection means on said duct, selectable between a first mode in which the first fluid having been processed through said electrostatic precipitator is directed through the duct to said hole and a second mode in which fluid from an outside source is directed through said duct to said hole.

12. A device as claimed in claim 10, wherein said second fluid includes the first fluid which has been processed by said precipitator.

13. A device for use in an electrostatic precipitator having an end wall defining a chamber in which a first fluid to be cleaned flows, comprising:

an electrically insulating disk, said disk including means for mounting the disk in an opening in the end wall of the electrostatic precipitator so that a first side of the disk is within the flow of the first fluid to be cleaned, said disk having a second side opposite the first side, said disk also having a hole for receiving a support rod; and means for supporting said support rod in said hole so as to allow a second fluid to flow through said hole between an inside surface of said hole and said support rod;

said hole begins at the second side of the disk and ends at the first side of the disk, and includes means for accelerating the flow of said second fluid through the disk into the chamber of the electrostatic precipitator, said hole includes a region wherein the diameter of the hole is reduced from a first diameter at the second side of the disk to a second diameter, that is narrower than the first diameter, at the first side of the disk;

wherein said hole includes a shoulder in the region, and said shoulder separates a first section of the hole having a substantially constant said first diameter from a second section of the hole having a substantially constant said second diameter.

14. A device as claimed in claim 13, wherein said first section of the hole extends from the shoulder to the second side of the disk and said second section of the hole extends from the shoulder to the first side of the disk.

* * * * *